United States Patent [19]

Bardos

[11] 3,997,722
[45] Dec. 14, 1976

[54] FACSIMILE REPRODUCTION SYSTEM
[75] Inventor: Andrew Miklos Bardos, Palm Bay, Fla.
[73] Assignee: The Associated Press, New York, N.Y.
[22] Filed: Sept. 10, 1975
[21] Appl. No.: 611,904

Related U.S. Application Data
[63] Continuation of Ser. No. 540,663, Jan. 13, 1975, abandoned.
[52] U.S. Cl. .................................. 178/7.6; 178/6; 178/7.7; 78/7.5 R; 178/DIG. 7; 178/DIG. 27
[51] Int. Cl.$^2$ ...................... H04N 3/08; H04N 3/10
[58] Field of Search .............. 178/7.6, 7.7, DIG. 7, 178/DIG. 27, 7.5 R, 6

[56] References Cited
UNITED STATES PATENTS

| | | | |
|---|---|---|---|
| 2,911,463 | 11/1959 | Kretzmer | 178/7.7 |
| 3,614,312 | 10/1971 | Fourier | 178/7.6 |
| 3,617,931 | 11/1971 | Pinnow | 178/7.6 |
| 3,835,249 | 9/1974 | Danttilo | 178/7.6 |

Primary Examiner—Robert L. Griffin
Assistant Examiner—Edward L. Coles
Attorney, Agent, or Firm—Nicholas L. Coch; Gerald Levy

[57] ABSTRACT

A facsimile reproduction system is disclosed. The system utilizes a laser beam at the transmission station to scan across an image to be reproduced through an acousto-optic modulator (AOM) cell. The laser beam is reflected off the image onto photo detector cells to generate electrical signals analogous to tonal variation in the image. A laser beam at the receiver station is also provided to sensitize a sheet of sensitized paper to produce a facsimile of the image. The intensity of the receiving station laser beam is modulated in accordance with the photo detector electrical signals by applying the signals to an rf carrier which then is applied to an AOM cell positioned between the laser and sensitized paper. Both the transmission and reception laser beams are rapidly deflected by modulating the frequency of the rf carrier driving the respective AOM cells so that the intensity of the effective scanning profile (perpendicular to the direction of scan) is constant across the entire width of the scan line for both transmission and reception and is close to the ideal profile.

20 Claims, 3 Drawing Figures

FACSIMILE REPRODUCTION SYSTEM

This is a continuation of application Ser. No. 540,663, filed Jan. 13, 1975, now abandoned.

BACKGROUND OF THE INVENTION

The present invention relates to facsimile reproduction equipment and in particular to a system for shaping the scanning spot of facsimile transmitting and receiving equipment for optimum reproduction.

Facsimile equipment is used to transmit visual images such as photographs and the like from one location to another. Images reproduced by a facsimile receiver generally exhibit a line or dot structure due to the scanning nature of the electro-optical reproduction process employed. Heretofore, attempts have been made, utilizing recent advances in the fields of electronics, physics and optics to minimize and ideally remove the lines or dots from the reproduction. To this end, facsimile equipment utilizing lasers have been employed with the laser beam passed through a suitable aperture arrangement to produce a generally rectangular scanning spot with a dimension transverse to the scan direction approximately equal to the scan spacing and the dimension along the scan direction somewhat smaller.

The shortcoming of the above system is that the natural spot profile for a laser beam is a circularly symmetrical Gaussian shape. By placing an aperture in the system, part of the Gaussian beam is cut off so that there is a light loss and hence a reduction in the efficiency of the system. In addition, diffraction problems arise from introducing an edge (of the aperture) into the beam resulting in (a) a reduction in the depth of focusing of the system and/or (b) ringing at the outer edges of the spot image. Further, adjustments to such systems require skilled technicians capable of diagnosing, measuring and varying the optics of the system.

In view of the above, it is the principal object of the present invention to provide a method of scanning for receiving and transmitting in facsimile equipment wherein the natural spot profile for a laser beam is utilized. A further object is to provide such a method wherein the circular beam is utilized to provide an elongated spot profile covering substantially the entire height of a scan line so that the reproduced image is virtually free of scan lines. A still further object is to provide a method wherein adjustments may be made electronically and withot requiring any optical adjustments.

SUMMARY OF THE INVENTION

The above and other beneficial objects and advantages are attained in accordance with the present invention by providing a facsimile system comprising a transmitter and receiver. The transmitter includes means for scanning an image to be reproduced and for generating an electrical energy signal the intensity of which varies in correspondence to density variations in the image scanned. The system further includes a receiver which utilizes a laser focused on a sheet of sensitized paper (or other substrate material which hereinafter are all termed "paper"). The spot profile of the laser is scanned across the sheet along scan lines greater in width than the diameter of the spot profile. An acousto-optic modulator cell is interposed between the laser and paper to modulate the intensity of the laser in response to variations in an applied electrical signal. The applied signal comprises the electrical energy transmitted from the optical cell. The receiver further includes means for cyclically varying the frequency of the applied electrical energy signal whereby to deflect the laser substantially between the top and bottom of the scan line transverse to the direction of scan. The deflection of the laser beam perpendicular to the direction of scan occurs at a rate much faster than movement in the scan direction. The transmitter may also utilize a laser beam scanner and an acoustooptic modulator interposed between the laser and image.

DETAILED DESCRIPTION OF THE PREFERRED EMBODIMENT

Figure 1:
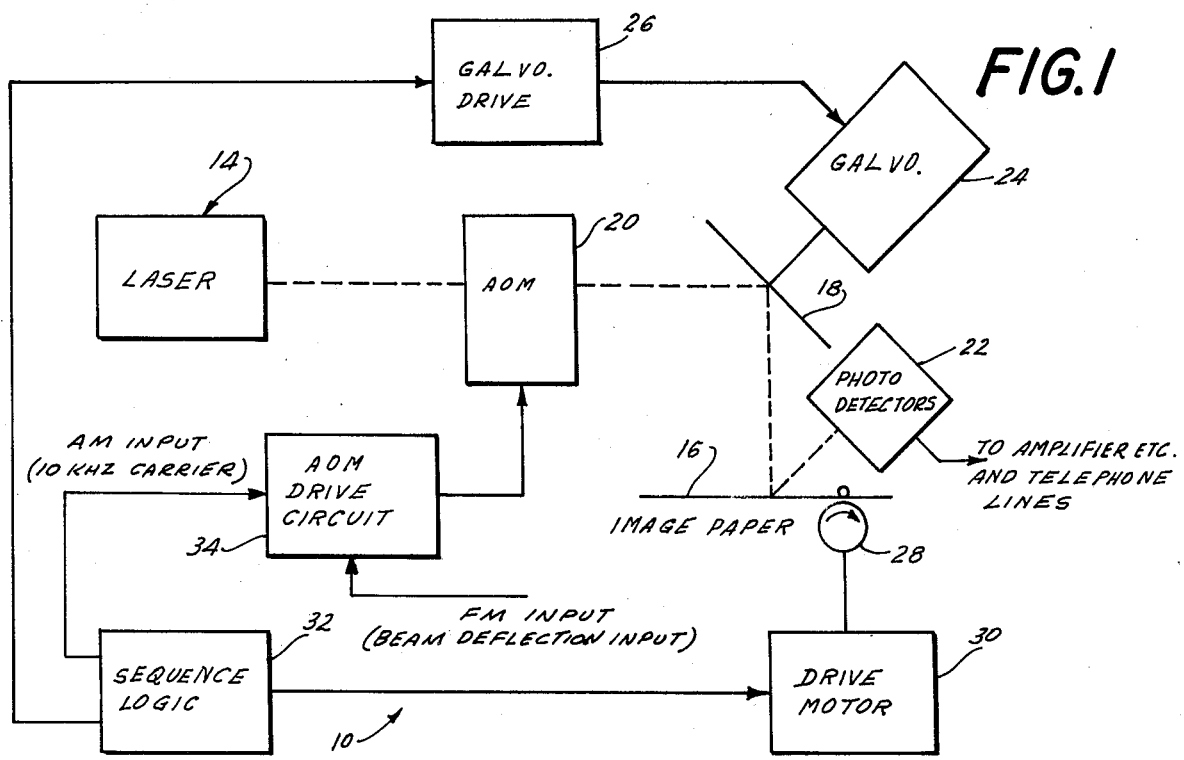
FIG. 1 is a block diagram representation of the transmitter of a facsimile system in accordance with the present invention.

Reference is now made to the drawings wherein similar components bear the same reference numerals throughout the several views. The facsimile system of the present invention comprises a transmitter 10 depicted in FIG. 1 and a receiver 12 depicted in FIG. 2.

Referring to FIG. 1, the transmitter portion 10 of the present system includes a helium-neon laser 14. The coherent light of the laser is focused as a precisely dimensioned beam on the sheet 16 containing the image to be reproduced through a reciprocating mirror 18 and an acousto-optic modulator cell 20. The intensity of the light reflected off the image is sensed by photoelectric cells 22. In response to the reflected light, the photoelectric cells 22 generate an electrical energy signal which is suitably amplified and transmitted to an appropriate receiver through telephone lines or the like. The intensity of the light reflected at any instance to the photoelectric cells is a function of the density tone of the portion of the image scanned at that time. Thus, variations in the intensity of the output signal of the photoelectric cells are representative of tonal changes in the image.

As stated, the light beam to the image is reflected off mirror 18. Mirror 18 is reciprocated by a galvanometer motor 24 which, in turn, is precisely driven by control 26. The deflection of the light beam off mirror 18 thus serves to enable the beam to scan across the width of the image sheet 16. At the same time, the sheet 16 is supported and transported longitudinally by rollers 28 driven by motor 30. Synchronization between drive motor 30 and the galvanometer drive 26 is maintained by sequence logic 32.

Each time the reflected light scans across paper 16, a scan line results having a line height in the longitudinal direction (i.e., the direction of movement of paper 16).

In order that a reproduction of the image not result with visible lines, it is important that the intensity of the scanning beam be kept constant across the entire height of the scan line during both transmitting and receiving. In accordance with the present invention, this is accomplished by utilizing a scanning spot having a diameter smaller than the height of the scan line and then rapidly deflecting the spot between the upper and lower limits of the scan line. This has the effect of an efficient aperture without its disadvantages and permits a blending of scan lines at top and bottom to reduce or eliminate their visibility in the facsimile product.

To this end, the laser beam passes through an acoustooptic modulator (AOM) cell 20. The AOM cell is a small section of glass upon which a piezoelectric transducer has been fused. The transducer reacts to the application of current sending acoustic waves into the glass, changing its refractive index in precise relationship to the presence of the acoustic signal. The details of the construction and properties of such cells are described in the literature, as for example, the article "A Review of Acoustooptical Deflection and Modulation Devices" by E. I. Gordon, published in the October, 1966 Applied Optics. It suffices to say for the present application, that such cells possess the following two properties:

1. The intensity of a laser beam passing through the cell is modulated as a function of the strength of an rf signal applied to the cell; and,
2. The angular deflection of a laser beam passing through the cell is a function of the frequency of an rf signal applied to the cell.

The transmitter 10 makes use only of the second of the above described properties of the acousto-optic modulator. As will be described forthwith, the receiver 12 makes use of both.

Figure 3:
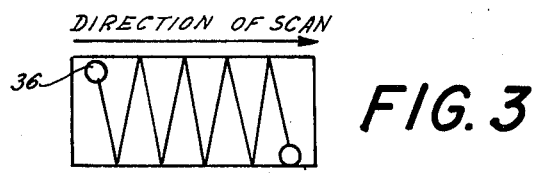

Referring still to FIG. 1, it can be seen that an rf signal is applied to the acousto-optic modulator 20 through a drive circuit 34. The drive circuit 34 of the transmitter produces a constant strength signal on a 10 KHz carrier to enable narrow band signal detection at the 10 KHz carrier to eliminate low frequency interference (such as 60 Hz interference) ensuring constant laser light signal intensity on the photograph being transmitted. The frequency of the rf signal varies cyclically between upper and lower limits chosen to deflect the scanning spot 36 so that it undulates as it traverses across the scan line as shown in FIG. 3. Deflecting the spot across the height of a scan line at a very high rate produces a signal out of the photodetectors as if a rectangular shaped spot were used. Since the intensity of the 10 KHz laser beam directed onto the image is constant, variations in the output of the photodetector circuit represent variations in the tonal intensity of the image.

Figure 2:
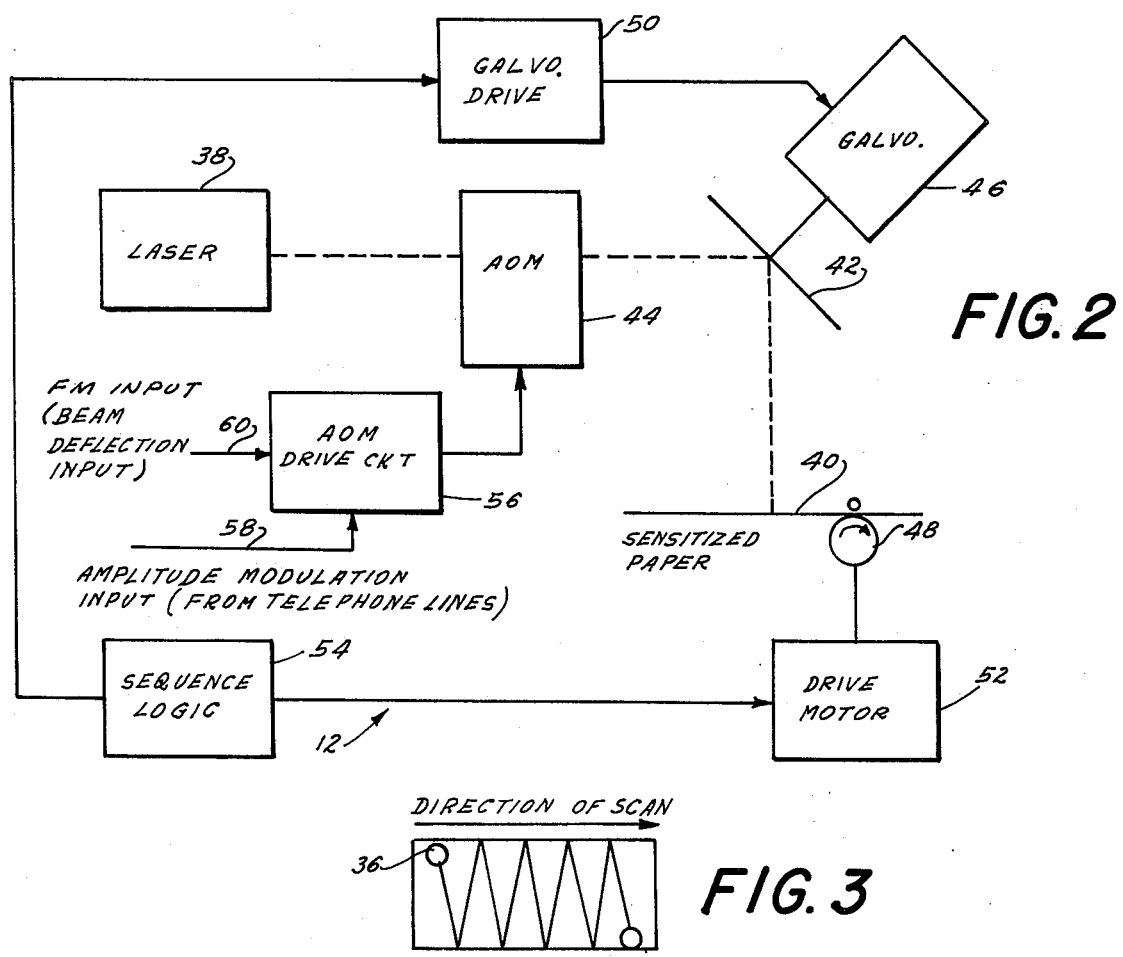
FIG. 2 is a block diagram representation of a receiver in accordance with the present invention; and, FIG. 3 is a simplified plan representation of a surface scanned in accordance with the present invention.

The receiver of the present system is depicted in FIG. 2. The construction of the receiver 12 is substantially the same as the transmitter 10. The principal difference is that the receiver AOM is driven by a frequency modulated signal of varying strength. Thus, the receiver 12 comprises a helium-neon laser identical in construction with laser 14 of the transmitter. The coherent light beam of the laser is focused to produce a precisely dimensioned Gaussian spot on a sheet of sensitized paper 40. The sensitized paper 40 may, for example, comprise a drysilver paper such as that developed and produced by the 3M Company of Minneapolis, Minnesota. This paper, upon being exposed to a laser beam can be heat processed to produce an image the tonal intensity of which is a function of the intensity of the exposing laser.

The beam of laser 38 is reflected onto paper 40 off a reciprocating mirror 42 and through an acousto-optic modulator cell 44. As before, mirror 42 is reciprocated by a galvanometer motor 46 to scan across the width of the paper as the sensitized paper is advanced by rollers 48. The galvanometer drive 50 and roller drive 52 are synchronized by suitable logic 54.

The drive circuit 56 for the acousto-optic modulator produces an rf signal both amplitude and frequency modulated. Thus, one input 58 to drive circuit 56 is the suitably amplified output of the photodetector circuit of the transmitter. The other input 60 to drive circuit 56 is a frequency modulated carrier. Thus, the intensity of the laser beam impinging the sensitized paper varies with tonal variations of the image being reproduced. Additionally, the scanning spot undulates up and down within controlled limits as it traverses each scan line.

In a successful practice of the present invention, the velocity of the up-and-down motion of both the transmitting and receiving spots (as oriented in FIG. 3) was approximately 100 times faster than the horizontal scan velocity of the beam. That is, the dithering motion of the spot was at a rate of 2,000 in./sec. and the scan velocity was 19 in./sec. The band width of the signal was 2 KHz (500 Hz-2,500 Hz) and the dithering frequency was 120 KHz. It has been found that the dithering frequency must be at least 10 times greater than the signal band width to prevent cross-talk. The rf signal was frequency modulated by ±10 MHz. The transmitting and receiving scan line height was approximately 0.010 inches and the spot diameter 0.004 inches. The facsimile transmission from transmitter 10 to receiver 12 resulted in a reproduction virtually free of scan lines.

It should be appreciated that while the transmitter and receiver of the present invention are disclosed herein in a complete system, the components may be used with compatible conventional equipment. That is, the receiver could receive transmitted images from a conventional transmitter and the transmitter could transmit images to a conventional receiver.

Having thus described the invention, what is claimed is:

1. A facsimile system comprising:
   a transmitter including: means for scanning an image to be reproduced; means for generating an electrical energy signal the intensity of which varies in correspondence to density variations in the image scanned; and means for transmitting said electrical signal to a receiver; and,
   a receiver including: a laser having a beam focused on a sheet of sensitized paper; a sheet of light sensitized paper; means for scanning said laser beam across said sheet to produce a scan line, the variations in the exposure of the paper corresponding to the intensity of said laser beam; an acousto-optic modulator cell means interposed between said laser and paper to modulate the intensity of said laser beam in response to variations in an applied electrical signal; means for applying said transmitter electrical energy signal to said optical cell on an rf carrier; and,
   means for cyclically varying the frequency of said carrier whereby to deflect said laser beam substantially between the top and bottom of said scan line in an undulating path generally transverse to the direction of scan.

2. The system in accordance with claim 1 wherein said laser is focused to produce an image spot on said sheet and the diameter of said spot is smaller than the height of said scan line.

3. The system in accordance with claim 1 wherein said transmitter comprises:
   a laser; means for scanning a beam from said laser across said image; acousto-optic modulator cell means interposed between said laser and image to modulate the intensity of the laser in response to the amplitude of an applied signal; means for applying a constant amplitude signal to said cell; and means for cyclically varying the frequency of said aforementioned signal to deflect said laser beam in an undulating path generally transverse to the direction of scan.

4. The system in accordance with claim 1 wherein said frequency varying means deflects said laser beam at a faster rate than said scanning means scans said laser beam across said sheet.

5. The system in accordance with claim 4 wherein said frequency varying means deflects said laser beam at a frequency at least 10 times greater than the signal band width as determined by the laser scan velocity.

6. The method of facsimile reproduction comprising the steps of:
scanning an image to be reproduced along a scan line and generating an electrical signal varying in correspondence with variations in the color of the image along said scan line; transmitting said varying signal to a receiver; applying said varying signal to an acousto-optical modulator cell within said receiver, said cell being adapted to vary the intensity of a laser beam passing therethrough in accordance with variations in said signal;
scanning a sheet of sensitized paper with a focused laser beam through said cell to produce an image variations in the tone of which corresponds to variations in the intensity of said laser beam; and,
modulating the frequency of said applied varying signal whereby to deflect said laser beam in an undulating path generally transverse to the direction of scan.

7. The method in accordance with claim 6 wherein said laser is focused to produce a beam on said sheet the diameter of which is smaller than the height of said scan line.

8. The method in accordance with claim 6 wherein said image scanning step comprises the substeps of:
scanning a laser beam across said image through an optical cell, said optical cell being adapted to alter the intensity of the laser impinging upon said image in response to the amplitude of an applied electrical signal;
applying a constant carrier signal to said cell; and,
frequency modulating said signal whereby to deflect said laser beam in an undulating path generally transverse to the direction of scan.

9. The method in accordance with claim 6 wherein said frequency varying means deflects said laser beam at a faster rate than said scanning means scans said laser beam across said sheet.

10. The method in accordance with claim 9 wherein said frequency varying means deflects said laser beam at a frequency at least 10 times greater than the signal band width as determined by the laser beam scan velocity.

11. A receiver for use in a facsimile reproduction system, said receiver comprising: means for supporting and transporting a sheet of sensitized paper; a laser having a beam focused on a sheet of sensitized paper supported by said aforementioned means; means for scanning said laser beam across said sheet along a scan line; an acousto-optic modulator cell means interposed between said laser and said sheet supporting means; means for applying an rf signal to said acousto-optic modulator cell means; first means for modulating the intensity of said rf signal in response to variations in a transmitted signal of an image to be reproduced; and, second means for cyclically varying the carrier frequency of said rf signal.

12. The receiver in accordance with claim 11 wherein said laser is focused to produce an image spot on said sheet and the diameter of said spot is smaller than the height of said scan line.

13. The system in accordance with claim 11 wherein said frequency varying means deflects said laser beam at a faster rate than said scanning means scans said laser beam across said sheet.

14. The system in accordance with claim 13 wherein said frequency varying means deflects said laser beam at a frequency at least 10 times greater than the signal band width as determined by the laser scan velocity.

15. A transmitter for use in a facsimile reproduction system, said transmitter comprising: an image supporting means; a laser; means for scanning a beam from said laser across said image; acousto-optic modulator cell means interposed between said laser and image supporting means; means for applying a constant amplitude signal on an rf carrier to said cell means; means for cyclically varying the frequency of said aforementioned rf carrier to deflect said laser beam in an undulating path generally transverse to the direction of scan; photoelectric cell means; and means for reflecting said laser beam off said image onto said photoelectric cell means to generate an image transmission signal.

16. The transmittter in accordance with claim 15 wherein said laser is focused to produce an image spot on said sheet and the diameter of said spot is smaller than the height of said scan line.

17. The system in accordance with claim 15 wherein said frequency varying means deflects said laser beam at a faster rate than said scanning means scans said laser beam across said sheet.

18. The system in accordance with claim 17 wherein said frequency varying means deflects said laser beam at a frequency at least 10 times greater than the signal band width as determined by the laser scan velocity.

19. A receiver for use in a facsimile reproduction system, said receiver comprising: a laser having a beam focused on a sheet of sensitized paper; a sheet of light sensitized paper; means for scanning said laser beam across said sheet to produce a scan line, the variations in the exposure of the paper corresponding to the intensity of the laser beam reaching the paper; an acousto-optical modulator cell interposed between said laser and said paper; means for applying an rf signal to said acousto-optical cell; means for modulating the intensity of said laser beam in response to variations in a transmitted electrical energy signal of an image to be reproduced; and means for cyclically varying the frequency of said rf signal whereby to deflect said laser beam substantially between the top and bottom of said scan line in an undulating path generally transverse to the direction of scan.

20. The receiver in accordance with claim 19 wherein said rf signal is a carrier for said electrical energy signal.

* * * * *